Aug. 18, 1931.  C. LOCREILLE  1,819,959
RECEIVING TABLE FOR CAST GLASS
Filed March 27, 1930

Inventor
Claude Locreille
By
E. F. Wenderoth
Atty.

Patented Aug. 18, 1931

1,819,959

UNITED STATES PATENT OFFICE

CLAUDE LOCREILLE, OF FAUQUEZ, BELGIUM

RECEIVING TABLE FOR CAST GLASS

Application filed March 27, 1930, Serial No. 439,518, and in Belgium April 9, 1929.

The present invention relates to tables for receiving cast or rolled glass in the manufacture of glass plates and sheets.

An object of this invention is to provide a receiving or casting table for glass works capable of withstanding, without getting deformed, split or damaged, high temperatures and sudden temperature changes, which are injurious to the usual metal and refractory tables used heretofore.

A further object is to provide a table adapted to be made of one piece, whatever its size, thus removing the inconvenience of expansion joints getting marked into the plastic glass, such table offering a perfectly smooth and plane surface whereon the glass has no tendency to stick.

Another object is to remove the necessity of cooling means even when the table is subjected to extensive work.

These objects are attained in accordance with my invention by using, for the construction of the table, a sandless concrete, made of a cement obtained by burning a mixture of lime, silica and alumina which then is finely ground, and of more or less big fragments of porphyry which are embedded in said cement and distributed across the thickness of the table according to their size, in such a way that the largest fragments form the bottom layer and the finest ones the top layer, the intermediate layers being composed of fragments of decreasing size. A series of horizontally superposed metal armatures are embedded in the concrete in order to strengthen the table, said armatures being made for instance of steel or other metal having a low coefficient of expansion. The table is preferably encircled by a band or a hoop made of the same metal, so as to protect its sides against blows and damages.

To construct the receiving table, the successive layers of porphyry fragments of decreasing size mixed with cement and the metal bars are arranged in a suitable casing and left therein until the cement has set. By way of example I may quote for the mixture of cement and porphyry a proportion of 700 kilogs. of cement to one cubic metre of porphyry fragments.

The accompanying drawings show by way of example a receiving table constructed according to the present invention.

Figure 1:
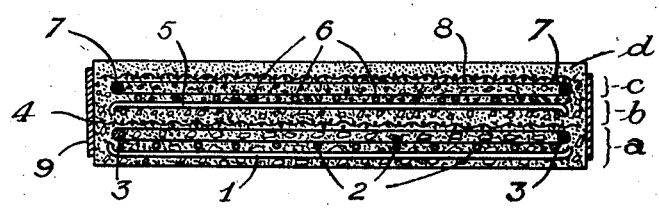
Fig. 1 is a cross-sectional view of the table.
Figure 2:
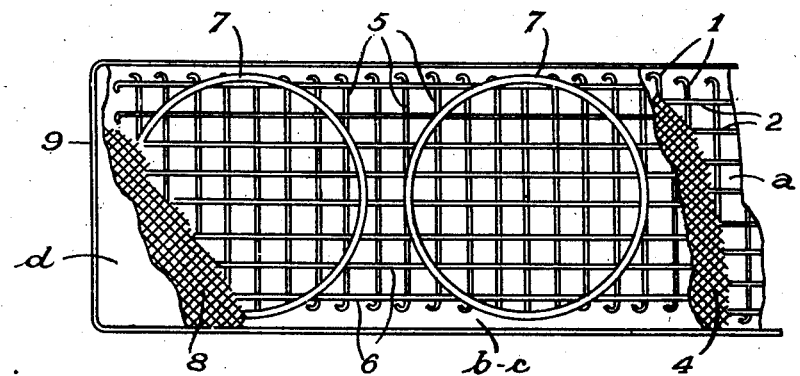
Fig. 2 is a plan view thereof broken away at several points to show the various superposed reinforcing bars.

The base of the table consists of a layer $a$ of concrete containing fragments of porphyry having say 20 to 30 millimeters in size. Transverse and longitudinal reinforcing bars, indicated respectively by the numerals 1 and 2, are embedded in this layer $a$, and on these bars rest reinforced circles 3 covered with fine mesh wire netting 4. On the latter is a second layer $b$ of concrete formed of smaller porphyry fragments, of 10 to 20 mm. for instance, said layer being thinner than the first one and followed by a third layer $c$ wherein the porphyry fragments will be for instance 5 to 10 mm.

A second series of armatures comprising cross bars 5, longitudinal bars 6 and circles 7 is embedded in the two layers $b$, $c$, these being separated by a further wire netting 8 from the upper layer $d$ forming the surface of the table. The fragments of porphyry contained in the concrete composing this layer $d$ are pulverized, in order that the top surface of the table shall offer no rough portions and be perfectly even and smooth so as to leave no traces on the glass sheets received thereon. 9 indicates the metal hoop encircling the table.

It is well understood that the manner in which the armatures are arranged, and the porphyry fragments distributed, as well as the size of the latter are given merely by way of example and that these various details may be modified without departing from the present invention.

I claim

1. A table for casting and receiving glass plates and sheets, said table comprising a slab made of a concrete formed of a ground mixture of lime, silica and alumina, with fragments of porphyry embedded therein, said fragments being distributed according to their size across the thickness of the slab, the larger fragments being at the bottom and the smaller fragments at the top.

2. A table for casting and receiving glass plates and sheets, said table comprising a slab made of a concrete formed of a ground mixture of burned lime, silica and alumina, with fragments of porphyry embedded therein, metal armatures embedded in said concrete, said fragments of porphyry being of decreasing size from the bottom to the top of said slab, and a metal band encircling said slab.

3. A table for casting and receiving glass plates and sheets, said table comprising a slab made of a concrete formed of a ground mixture of burned lime, silica and alumina, with superposed layers of fragments of porphyry embedded therein, metal armatures embedded in said layers, the size of said fragments gradually decreasing from the bottom layer to the top layer, the fragments in the top layer being in powder form, and a metal band encircling said slab.

4. A table for casting and receiving glass plates and sheets, said table comprising a slab made of a concrete formed of a ground mixture of burned lime, silica and alumina, with fragments of porphyry embedded therein, said slab comprising a bottom layer having fragments of porphyry 20 to 30 mm. in size, intermediate layers with fragments respectively 10 to 20 mm. and 5 to 10 mm. in size, and a top layer containing pulverized porphyry, metal armatures embedded in each except the top layer, said armatures comprising transverse and longitudinal bars, circles and wire netting, and a metal band encircling said slab.

5. A table for casting and receiving glass plates and sheets, said table comprising a slab of concrete having fragments of hard stone embedded therein, said fragments being of varying size from the bottom to the top of said slab, the finest fragments being at the top, and a metal band encircling said slab.

6. A table for casting and receiving glass plates and sheets, said table comprising a slab of concrete having fragments of hard stone embedded therein, said fragments being coarse at the bottom of said slab and fine at and near the surface thereof, and metal armatures embedded in said concrete, said armatures comprising rods, hoops and wire netting.

In testimony whereof I affix my signature.

CLAUDE LOCREILLE.